(12) United States Patent
Li et al.

(10) Patent No.: US 9,739,190 B2
(45) Date of Patent: Aug. 22, 2017

(54) METHOD AND APPARATUS TO CONTROL REDUCTANT INJECTION INTO AN EXHAUST GAS FEEDSTREAM

(71) Applicant: GM GLOBAL TECHNOLOGY OPERATIONS LLC, Detroit, MI (US)

(72) Inventors: Shifang Li, Shelby Township, MI (US); Min Sun, Troy, MI (US); Kevin Andrew Gady, Saline, MI (US); Raffaello Ardanese, Turin (IT); Giuseppe Mazzara Bologna, Nicosia (IT)

(73) Assignee: GM Global Technology Operations LLC, Detroit, MI (US)

( * ) Notice: Subject to any disclaimer, the term of this patent is extended or adjusted under 35 U.S.C. 154(b) by 19 days.

(21) Appl. No.: 14/939,570

(22) Filed: Nov. 12, 2015

(65) Prior Publication Data

US 2017/0138237 A1 May 18, 2017

(51) Int. Cl.
*F01N 3/20* (2006.01)
*F02B 9/02* (2006.01)
*F02B 5/00* (2006.01)

(52) U.S. Cl.
CPC ............... *F01N 3/208* (2013.01); *F02B 5/00* (2013.01); *F02B 9/02* (2013.01); *F01N 2560/026* (2013.01); *F01N 2570/14* (2013.01); *F01N 2570/18* (2013.01); *F01N 2610/02* (2013.01); *F01N 2610/1453* (2013.01); *F01N 2900/0412* (2013.01); *F01N 2900/0601* (2013.01); *F01N 2900/1402* (2013.01); *F01N 2900/1616* (2013.01); *F01N 2900/1621* (2013.01)

(58) Field of Classification Search
CPC ............... F01N 3/208; F01N 2560/026; F01N 2570/14; F01N 2570/18; F01N 2610/02; F01N 2610/1453; F01N 2900/0412; F01N 2900/0601; F01N 2900/1402; F01N 2900/1616; F01N 2900/1621
USPC .......................... 60/274, 276, 286, 295, 301
See application file for complete search history.

(56) References Cited

U.S. PATENT DOCUMENTS

7,736,595 B2 6/2010 Gady et al.
8,096,110 B2 1/2012 Solbrig
(Continued)

*Primary Examiner* — Jorge Leon, Jr.
(74) *Attorney, Agent, or Firm* — Quinn IP Law (57) ABSTRACT

An exhaust system for a lean-burn internal combustion engine is described, and includes an injection system for injecting reductant into an exhaust gas feedstream upstream of a selective catalytic reduction device (SCR). A control method for controlling the injection system includes determining an upstream NOx gas concentration upstream of the SCR device, determining a measured downstream NOx gas concentration based upon a signal output from a sensor configured to monitor NOx gas concentration downstream of the SCR device, and determining an estimated downstream NOx gas concentration based upon an executable model. A first correlation between the upstream NOx gas concentration and the measured downstream NOx gas concentration is determined, and a second correlation between the upstream NOx gas concentration and the estimated downstream NOx gas concentration is determined. The reductant injection is controlled based upon the first and second correlations.

13 Claims, 3 Drawing Sheets

(56) References Cited

U.S. PATENT DOCUMENTS

| | | | |
|---|---|---|---|
| 2010/0024389 A1* | 2/2010 | Gady | B01D 53/30 |
| | | | 60/274 |
| 2011/0005209 A1 | 1/2011 | Gady et al. | |
| 2011/0138779 A1* | 6/2011 | Neumayer | F01N 3/208 |
| | | | 60/274 |
| 2014/0056788 A1* | 2/2014 | Breitschaedel | B01D 53/9495 |
| | | | 423/212 |
| 2014/0301925 A1* | 10/2014 | Korpics | B01D 53/9495 |
| | | | 423/212 |
| 2015/0273395 A1* | 10/2015 | Catalogna | B01D 53/9495 |
| | | | 423/212 |
| 2015/0361845 A1* | 12/2015 | Garimella | F01N 3/208 |
| | | | 60/274 |

\* cited by examiner

METHOD AND APPARATUS TO CONTROL REDUCTANT INJECTION INTO AN EXHAUST GAS FEEDSTREAM

TECHNICAL FIELD

This disclosure relates generally to exhaust aftertreatment systems for internal combustion engines, and more particularly to control related to selective catalytic reduction devices in exhaust aftertreatment systems.

BACKGROUND

Manufacturers of internal combustion engines develop engine control strategies to satisfy customer demands and meet various regulations. One such engine control strategy includes operating an engine at an air/fuel ratio that is lean of stoichiometry to improve fuel economy and reduce greenhouse gas emissions. Such engines include both compression-ignition (diesel) and lean-burn spark-ignition engines. An engine operating in a lean air/fuel ratio region may have elevated combustion temperatures, which may lead to increased oxides of nitrogen (NOx) emissions.

One known exhaust aftertreatment system and control strategy for managing and reducing NOx emissions involves injecting a reductant, such as urea, into an exhaust gas feedstream upstream of a selective catalytic reduction (SCR) device. Urea is known to decompose into ammonia (also referred to herein as NH3) when heated. Known SCR devices may store ammonia on a catalyzed surface, and NOx present in an exhaust gas feedstream may be reduced to nitrogen gas, water, and carbon dioxide by interaction with the stored ammonia in the SCR. An SCR device has a maximum ammonia storage capacity that is inversely related to its operating temperature. Known SCR catalysts operate most effectively within a temperature range between 300° C. and 500° C. When too little ammonia is stored in the SCR device as compared to NOx concentration in the exhaust feedstream, conversion efficiency may drop, and NOx emissions exiting the exhaust aftertreatment system may increase. Conversely, when the maximum ammonia storage capacity of the SCR device is exceeded, NH3 may exit the SCR device. This process is referred to as ammonia slip. Additionally, if the operating temperature of the SCR device increases rapidly at a time when ammonia storage is near its maximum, ammonia slip may also occur due to the inverse relationship between the temperature of the SCR device and its maximum ammonia storage capacity. This can occur, for example, when exhaust gas temperature increases rapidly due to heavy accelerator pedal tip-in by the vehicle operator. Known methods for managing ammonia storage in SCR devices rely on signal inputs from sensors, which attempt to measure real-time values of various engine operating parameters and exhaust gas parameters. Reductant injection may be controlled based thereon.

SUMMARY

An exhaust system for a lean-burn internal combustion engine is described, and includes an injection system for injecting reductant into an exhaust gas feedstream upstream of a selective catalytic reduction device (SCR). A control method for controlling the injection system includes determining an upstream NOx gas concentration in the exhaust gas feedstream upstream of the SCR device, determining a measured downstream NOx gas concentration in the exhaust gas feedstream based upon a signal output from a sensor configured to monitor NOx gas concentration downstream of the SCR device, and determining an estimated downstream NOx gas concentration in the exhaust gas feedstream based upon an executable model. A first correlation between the upstream NOx gas concentration and the measured downstream NOx gas concentration is determined, and a second correlation between the upstream NOx gas concentration and the estimated downstream NOx gas concentration is determined. The reductant injection is controlled based upon the first and second correlations.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
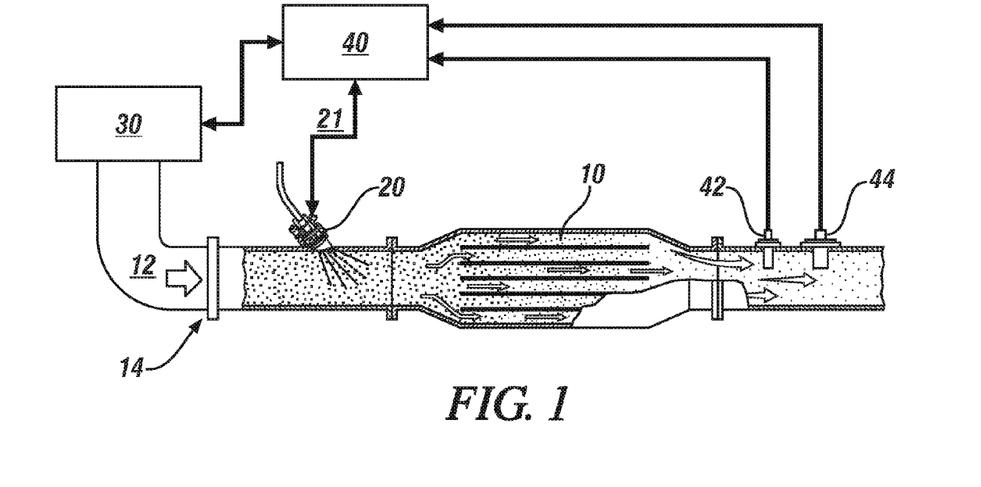
FIG. 1 schematically illustrates an embodiment of an ammonia-selective catalytic reduction device (SCR) and accompanying reductant dosing system of an exhaust aftertreatment system that fluidly connects to an internal combustion engine, in accordance with the disclosure.

Referring to the drawings, wherein like numerals indicate like or corresponding parts throughout the several views, FIG. 1 schematically illustrates an embodiment of an ammonia-selective catalytic reduction device (SCR) 10 and a reductant dosing system 20 that are elements of an exhaust aftertreatment system 14 that fluidly connects to an internal combustion engine (engine) 30, whose operation is controlled by a controller 40. The engine 30 may be any suitable internal combustion engine that operates lean of stoichiometry, including, by way of non-limiting examples, a compression-ignition engine or a lean-burn spark-ignition engine.

The exhaust aftertreatment system 14 preferably includes the SCR 10 and may also include other devices, e.g., an oxidation catalyst and a particulate filter, that are suitable for oxidizing, reducing, filtering or otherwise purifying constituent elements of exhaust gases in the exhaust gas feedstream. The arrangement and use of specific devices including the SCR 10 for treating exhaust gases is not restricted to a specific design configuration or layout. The SCR 10 may be employed for purifying exhaust gases, specifically NOx gases in an exhaust gas feedstream 12 that is expelled from the internal combustion engine 30. In one embodiment, the SCR 10 may be an ammonia-selective SCR device that reduces NOx molecules to elemental nitrogen and some form of an oxide in the presence of a reductant that may include ammonia molecules, such as may be supplied in the form of anhydrous ammonia, aqueous ammonia or urea. The SCR 10 stores ammonia molecules on its catalytic surface. Embodiments of the SCR 10 may include, by way of non-limiting examples, active catalytic components embedded on a ceramic flow-through substrate housed in a metallic assembly, wherein the active catalytic components may include: titanium oxide; metal oxides such as vanadium, molybdenum, and tungsten; zeolites; and/or platinum-group metals. The concepts described herein are not limited to a specific embodiment of the SCR 10.

The exhaust aftertreatment system 14 also includes sensors and estimation techniques for monitoring parameters related to the exhaust gas feedstream 12, preferably including a temperature sensor 42 and a NOx sensor 44 that are arranged to monitor the exhaust gas feedstream 12 downstream of the SCR 10. Another sensor may include a mass air flow sensor, e.g., an intake air mass air flow sensor, which may be employed to monitor exhaust gas flowrate. Alternatively, mass air flow may be estimated or otherwise determined using known estimation techniques and routines such as those based upon speed-density calculations. Other sensors, e.g., an ammonia (NH3) sensor, an air/fuel ratio sensor, or another suitable exhaust gas constituent sensor may also be employed. The aforementioned sensors signally connect to the controller 40. The temperature sensor 42 and NOx sensor 44 may be any suitable sensing devices having signal processing circuits and/or algorithmic routines that perceive a physical or chemical stimulus and transform such perceived stimulus to an electrical signal that correlates to a state of a parameter of interest, e.g., temperature or NOx concentration. A sensing system may also be located upstream of the SCR 10 to monitor the exhaust gas feedstream 12 in the exhaust system 14 upstream of the SCR 10. This may include a device for monitoring NOx in the exhaust gas feedstream. Alternatively, the exhaust gas feedstream 12 upstream of the SCR 10 may be evaluated employing a virtual sensor that is configured to estimate NOx in the exhaust gas feedstream. A virtual sensor includes one or more algorithms and/or calibration lookup tables resident in the controller 40 that are employed to determine states related to NOx in the exhaust gas feedstream based upon present engine operating conditions.

The reductant dosing system 20 may include, by way of a non-limiting example, an injector device fluidly coupled to a refillable storage tank via a metering device, wherein the injector device is configured to inject a reductant in the exhaust gas feedstream 12 upstream of the SCR 10. A controller, e.g., the controller 40 operatively connects to a metering valve of the metering device. The controller 40 generates a dosing rate signal 21 to control the amount and timing of injection of the reductant into the exhaust gas feedstream 12. The reductant may be an aqueous solution of urea mixed with deionized water in one embodiment. In the exhaust feedstream 12, urea decomposes to form ammonia (NH3), which is stored in the SCR 10. Reductant dosing systems are known.

During operation of the engine 30, NOx molecules are generated and flow into the exhaust gas feedstream 12. The NOx molecules pass through the SCR 10, where they are reduced to nitrogen gas, water, and carbon dioxide by interaction with the stored ammonia (NH3) on its catalyst surface. The nitrogen gas, water, and carbon dioxide and other residuals then exit the SCR 10. The SCR 10 reduces NOx using the stored NH3 when the reductant is not being injecting into the exhaust aftertreatment system 12. The maximum NH3 storage capacity of the SCR 10 inversely relates to its operating temperature, The controller 40 is preferably a modular component of a distributed controller architecture having a plurality of controllers configured to provide coordinated control of various systems including the engine 30 and other powertrain driveline components. The controller 40 is operable to monitor inputs from sensing devices, synthesize pertinent information, and execute algorithms to control various actuators in order to achieve control targets, including such parameters as fuel economy, emissions, performance, drivability, and protection of hardware. The controller 40 is shown in signal communication with the engine 30, and functions to acquire data from sensors, and control a variety of actuators associated with engine 30. In operation, controller 40 receives an engine torque command, and generates a desired torque output, based upon the vehicle operator inputs. Exemplary engine operating parameters that may be measured or inferred by the controller 40 using the aforementioned sensors and other sensors and routines include engine coolant temperature, engine oil temperature, and/or other temperature, crankshaft rotational speed (RPM) and position, manifold absolute pressure, ambient air flow and temperature and ambient air pressure, and combustion parameters including air/fuel ratio, location of peak combustion pressure and other parameters.

The terms controller, control module, module, control, control unit, processor and similar terms refer to programmable data processing apparatuses in the form of one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 3.125, 6.25, 12.5, 25 and 100 milliseconds during ongoing operation. Alternatively, routines may be executed in response to occurrence of a triggering event. Communication between controllers, and communication between controllers, actuators and/or sensors may be accomplished using a direct wired link, a networked communications bus link, a wireless link or any another suitable communication link. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figure 2:
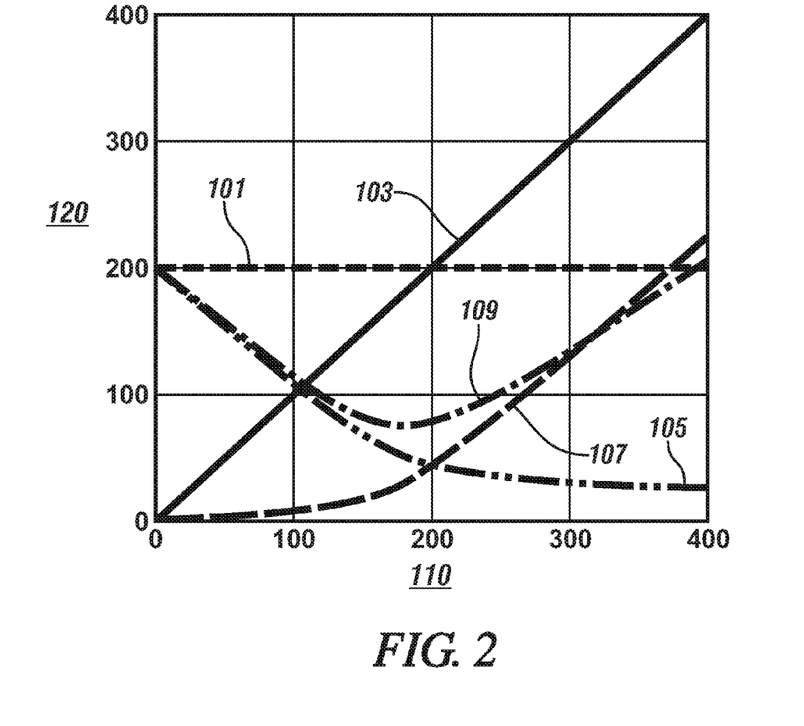
FIG. 2 graphically shows NOx/NH3 cross-sensitivity of an embodiment of a NOx sensor configured for monitoring NOx concentration in an exhaust gas feedstream downstream of an SCR, in accordance with the disclosure.

FIG. 2 graphically shows NOx/NH3 cross-sensitivity of an embodiment of the NOx sensor 44 configured for monitoring NOx concentration in an exhaust gas feedstream 12 downstream of an SCR device, e.g., an embodiment of the SCR 10 described with reference to FIG. 1. The SCR 10 is operating under stabilized temperature and flow conditions. Actual NOx concentration in parts per million (ppm) is shown on the horizontal axis 110, and measured NOx concentration in ppm is shown on the vertical axis 120. The results include NOx concentration upstream of the SCR 10 101, NH3 concentration upstream of the SCR 10 103, actual NOx concentration downstream of the SCR 10 105, actual NH3 concentration downstream of the SCR 10 107, and signal output from the NOx sensor 44 downstream of the SCR 10 109. The results show that the NH3 concentration upstream of the SCR 10 103 influences the signal output from the NOx sensor 44 downstream of the SCR 10 109. The results further indicate that a control system for controlling NH3 dosing may incorrectly indicate NOx concentration downstream of an SCR 10, and increase dosing of reductant, resulting in ammonia slip downstream of the SCR 10. Known systems that compensate for NOx/NH3 cross-sensitivity include NH3 feedback, and other control methodologies that include rule-based routines that are application-specific and thus may require significant on-board computational efforts and associated significant pre-release calibration effort.

Figure 3:
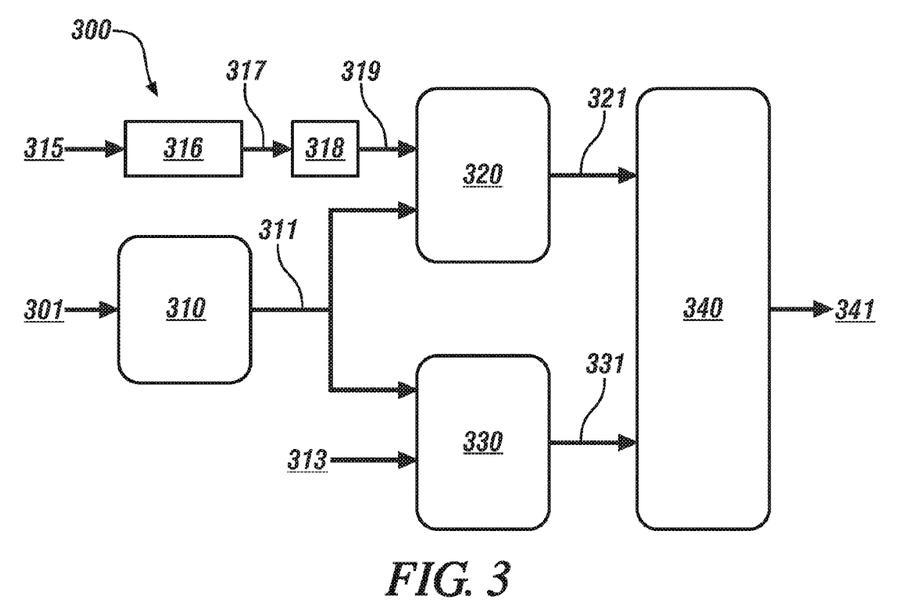
FIG. 3 schematically shows a functional block diagram of a control routine for determining an NH3 storage correction term that can be employed to adaptively control reductant injection on an embodiment of a reductant dosing system described with reference to FIG. 1, wherein the NOx sensor exhibits NOx/NH3 cross-sensitivity, in accordance with the disclosure.

FIG. 3 schematically shows a functional block diagram of a control routine 300 for determining an NH3 storage correction term 341 that can be employed to adaptively control reductant injection on an embodiment of a system described with reference to FIG. 1. The system described with reference to FIG. 1 includes an exhaust aftertreatment system 12 for an engine 30 that includes an embodiment of the SCR 10 that is monitored by an embodiment of the NOx sensor 44, wherein the NOx sensor 44 exhibits NOx/NH3 cross-sensitivity that is analogous to that shown with reference to FIG. 2. The functional block diagram illustrates the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a controller or other programmable data processing apparatus to function in a particular manner, such that the instructions stored in the computer-readable medium produce an article of manufacture including an instruction set that implements the function/act specified in the flowchart and/or block diagram block or blocks.

The control routine 300 includes determining a NOx-in state 301, which represents NOx gas concentration in the exhaust gas feedstream 12 upstream of the SCR 10. As described herein, the NOx-in state 301 may be determined by a sensing system located upstream of the SCR 10 to monitor the exhaust gas feedstream 12 that may include a device or a virtual sensor that determines NOx based upon present engine operating conditions. The NOx-in state 301 is subjected to a transport delay 310 to determine a NOx-in-delay state 311. The transport delay 310 is a time delay based upon engine airflow and sensor latency that is introduced into the NOx-in state 301 such that a quantum sample of the NOx-in state 301 is time-synchronized with a quantum sample of a NOx-out state, which may be either a first or second NOx-out state 319, 313, respectively. Sensor latency includes time delays introduced by sensor response time, analog-to-digital conversion and communication protocols, and indicates a time correspondence between a quantum sample of a NOx-out state and when the sensor signal associated with that quantum sample of the NOx-out state is accounted for and evaluated by the control routine 300.

The control routine 300 determines the first NOx-out state 319 and the second NOx-out state 313, both which represent NOx gas concentration in the exhaust gas feedstream 12 downstream of the SCR 10. The second NOx-out state 313 is a NOx gas concentration state in the exhaust gas feedstream that is indicated by the signal output from the NOx sensor 44 configured to monitor NOx gas concentration downstream of the SCR 10. The first NOx-out state 319 is a NOx gas concentration state in the exhaust gas feedstream downstream of the SCR 10, which may be estimated using an executable SCR model 316. One or a plurality of operating parameters 315 relate to operation of the engine 30 and the SCR 10 and include airflow, temperature, engine fueling, and reductant dosing. The operating parameters 315 are monitored and input to the SCR model 316, which generates an output signal 317. The output signal 317 from the SCR model is monitored using a NOx sensor model 318, which generates the first NOx-out state 319 based thereon, with associated latencies. SCR models and NOx sensor models and associated executable control routines for dynamically estimating a NOx gas concentration state in an exhaust gas feedstream downstream of an SCR device are known and not described in detail herein.

The first, estimated NOx-out state 319 and the NOx-in-delay state 311 are input to a first correlation analysis routine 320, and the second, measured NOx-out state 313 and the NOx-in-delay state 311 are input to a second correlation analysis routine 330. The first and second correlation analysis routines 320 and 330 are analogous statistical routines that evaluate time-based corresponding pairs of the first NOx-out state 319 and the NOx-in-delay state 311 (routine 320), or time-based corresponding pairs of the second NOx-out state 313 and the NOx-in-delay state 311 (routine 330) to determine the magnitude of the relationship therebetween as defined by an r-value.

The first correlation analysis routine 320 generates a first r-value, referred to herein as $r_m$ 321, which quantifies the statistical correlation between the first, estimated NOx-out state 319 and the NOx-in-delay state 311. The second correlation analysis routine 330 generates a second r-value, referred to herein as $r_s$ 331, which quantifies the statistical correlation between the second, measured NOx-out state 313 and the NOx-in-delay state 311. Techniques for statistical correlation analysis of corresponding data pairs are known and not detailed herein.

The first r-value $r_m$ 321 and the second r-value $r_s$ 331 are input to an NH3 storage correction routine 340. The NH3 storage correction routine 340 preferably includes a feed-forward proportional-integral control routine that generates an NH3 storage correction term 341 based upon an arithmetic comparison of the first r-value $r_m$ 321 and the second r-value $r_s$ 331, which can be represented as follows:

$$r = PI(r_s - r_m) \quad [1]$$

wherein PI indicates a proportional-integral term, and
r indicates the NH3 storage correction term 341

When the NH3 storage correction term 341 is greater than zero (r>0), this indicates that the correlation between the second, measured NOx-out state 313 and the NOx-in-delay state 311 is greater than the correlation between the first, estimated NOx-out state 319 and the NOx-in-delay state 311, which relates to low NH3 storage on the SCR 10 and under-dosing of the reductant injection. This is depicted graphically with reference to FIG. 4. As such, when the NH3 storage correction term 341 is greater than zero (r>0), the control routine 300 uses the NH3 storage correction term 341 to increase magnitude of reductant injection into the exhaust gas feedstream 12.

Figure 4:
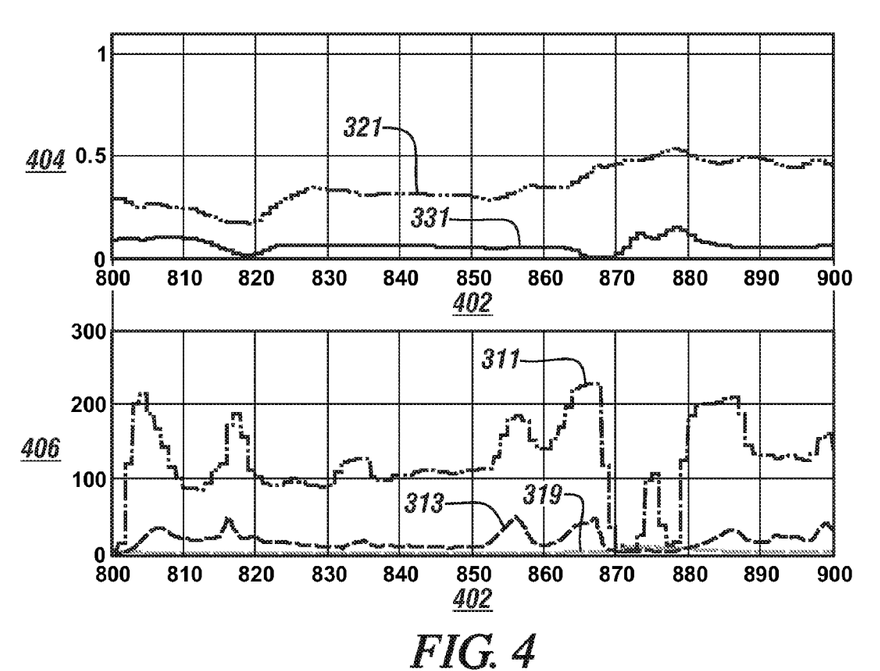
FIGS. 4, 5 and 6 each graphically show data representing NOx emissions and corresponding correlation coefficients related to operation of an embodiment of the internal combustion engine coupled to the exhaust aftertreatment system that includes the SCR and the accompanying reductant dosing system described with reference to FIG. 1, in accordance with the disclosure.

FIG. 4 graphically shows data representing NOx emissions (in ppm) 406 and corresponding correlation coefficients (ranging between 0 and 1) 404 over time (in seconds) 402 related to operation of an embodiment of the engine 30 having exhaust aftertreatment system 14 that includes the SCR 10 and reductant dosing system 20 described with reference to FIG. 1. Plotted data includes the NOx-in-delay state 311, the first, estimated NOx-out state 319, the second, measured NOx-out state 313, the first r-value $r_m$ 321 and the second r-value $r_s$ 331, as has been previously described. As shown, the data relates to engine operation in which the controller 40 has overestimated the NH3 storage based upon the signal input from the NOx sensor 44 and the NOx/NH3 cross-sensitivity shown with reference to FIG. 2. In this case, the second, measured NOx-out state 313 is less than the first, estimated NOx-out state 319, and the corresponding second r-value $r_s$ 331 is less than the corresponding first r-value $r_m$ 321. As such, the control routine 300 uses the NH3 storage correction term 341 to increase magnitude of reductant injection into the exhaust gas feedstream 12 by increasing the dosing rate signal 21.

Referring again to FIG. 3, when the NH3 storage correction term 341 is less than zero (r<0), this indicates that the correlation between the first, estimated NOx-out state 319 and the NOx-in-delay state 311 is greater than the correlation between the second, measured NOx-out state 313 and the NOx-in-delay state 311, which relates to high NH3 storage on the SCR 10 and over-dosing of the reductant injection with increased likelihood of ammonia slip. This is depicted graphically with reference to FIG. 5. As such, when the NH3 storage correction term 341 is less than zero (r<0), the control routine 300 uses the NH3 storage correction term 341 to decrease magnitude of reductant injection into the exhaust gas feedstream 12.

Figure 5:
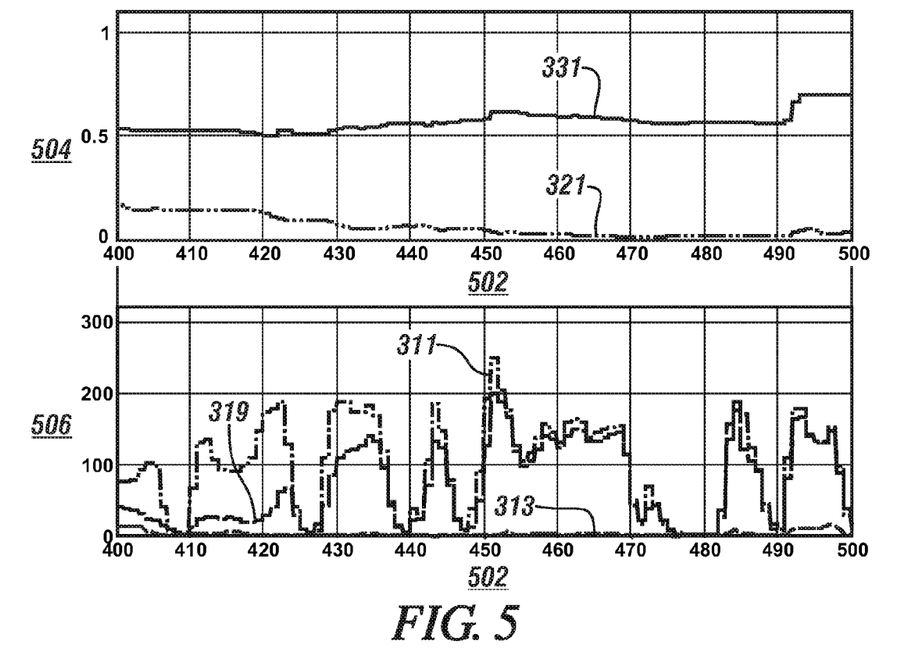

FIG. 5 graphically shows data representing NOx emissions (in ppm) 506 and corresponding correlation coefficients (ranging between 0 and 1) 504 over time (in seconds) 502 related to operation of an embodiment of the engine 30 having exhaust aftertreatment system 14 that includes the SCR 10 and reductant dosing system 20 described with reference to FIG. 1. Plotted data includes the NOx-in-delay state 311, the first, estimated NOx-out state 319, the second, measured NOx-out state 313, the first r-value $r_m$ 321 and the second r-value $r_s$ 331 as previously described. As shown, the data relates to engine operation, during which the controller 40 has underestimated the NH3 storage based upon the signal input from the NOx sensor 44 and the NOx/NH3 cross-sensitivity shown with reference to FIG. 2. In this case, the second, measured NOx-out state 313 is greater than the first, estimated NOx-out state 319, and the corresponding second r-value $r_s$ 331 is greater than the corresponding first r-value $r_m$ 321. As such, the control routine 300 uses the NH3 storage correction term 341 to decrease magnitude of reductant injection into the exhaust gas feedstream 12 by decreasing the dosing rate signal 21.

Referring again to FIG. 3, when the NH3 storage correction term 341 is equal to zero (r=0), this indicates that the correlation between the first, estimated NOx-out state 319 and the NOx-in-delay state 311 equals the correlation between the second, measured NOx-out state 313 and the NOx-in-delay state 311, which relates to an appropriate NH3 storage on the SCR 10 minimal likelihood of ammonia slip. This is depicted graphically with reference to FIG. 6. As such, when the NH3 storage correction term 341 is equal to zero (r=0), the control routine 300 uses the NH3 storage correction term 341 to maintain the magnitude of reductant injection into the exhaust gas feedstream 12 at its present level.

Figure 6:
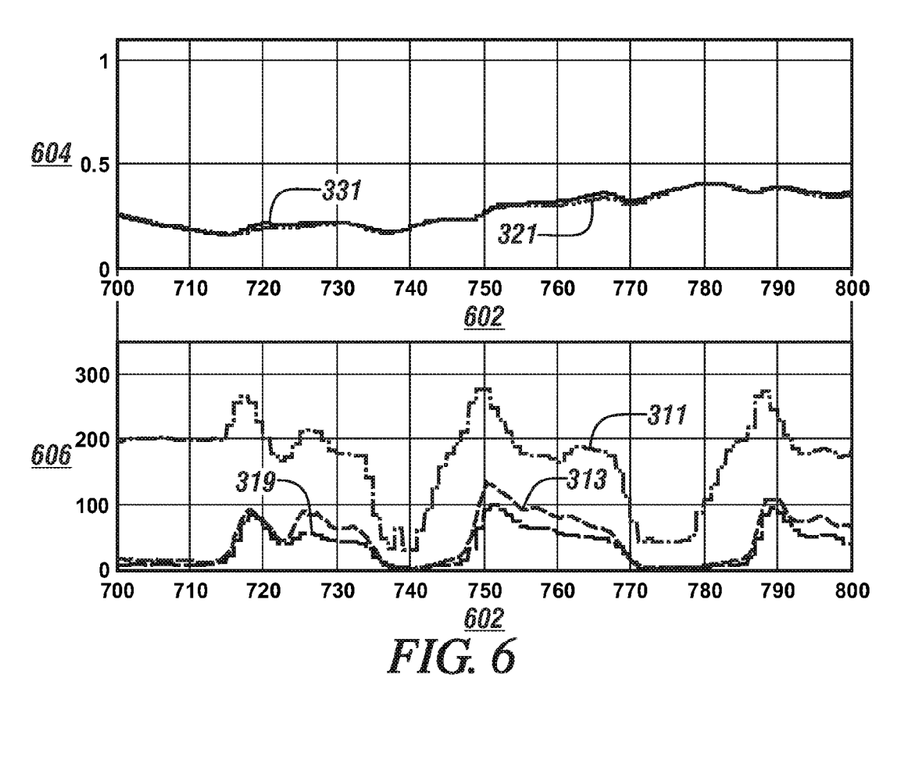

FIG. 6 graphically shows data representing NOx emissions (in ppm) 606 and corresponding correlation coefficients (ranging between 0 and 1) 604 over time (in seconds) 602 related to operation of an embodiment of the engine 30 having exhaust aftertreatment system 14 that includes the SCR 10 and reductant dosing system 20 described with reference to FIG. 1. Plotted data includes the NOx-in-delay state 311, the first, estimated NOx-out state 319, the second, measured NOx-out state 313, the first r-value $r_m$ 321 and the second r-value $r_s$ 331 as previously described. As shown, the data relates to engine operation in which the controller 40 has correctly estimated the NH3 storage based upon the signal input from the NOx sensor 44 and the NOx/NH3 cross-sensitivity shown with reference to FIG. 2. In this case, the second, measured NOx-out state 313 is equal to the first, estimated NOx-out state 319, and the corresponding second r-value $r_s$ 331 is equal to the corresponding first r-value $r_m$ 321. As such, the control routine 300 uses the NH3 storage correction term 341 to maintain the magnitude of reductant injection into the exhaust gas feedstream 12 by maintaining the dosing rate signal 21.

The concepts described herein may enable improved NOx conversion efficiency across an SCR with reduced likelihood of reductant slip. There is also the likelihood of reduced calibration effort, reduced computation effort and ongoing continuous correction for improved performance. The concepts described herein work equally well with exhaust aftertreatment systems that include NH3 slip catalysts and those that exclude NH3 slip catalysts.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling reductant injection into an exhaust gas feedstream of a lean-burning internal combustion engine, wherein the reductant is injected into the exhaust gas feedstream upstream of a selective catalytic reduction (SCR) device, the method comprising:
   determining an upstream NOx gas concentration in the exhaust gas feedstream upstream of the SCR device;
   determining a measured downstream NOx gas concentration in the exhaust gas feedstream based upon a signal output from a sensor configured to monitor NOx gas concentration downstream of the SCR device;
   determining an estimated downstream NOx gas concentration in the exhaust gas feedstream based upon an executable model operative to determine NOx gas concentration downstream of the SCR device;
   determining a first correlation between the upstream NOx gas concentration and the measured downstream NOx gas concentration;
   determining a second correlation between the upstream NOx gas concentration and the estimated downstream NOx gas concentration;
   executing a feed-forward proportional-integral control routine to generate an ammonia storage correction term based upon the first and second correlations; and
   controlling the reductant injection based upon the ammonia storage correction term.

2. The method of claim 1, wherein determining the first correlation between the upstream NOx gas concentration and the measured downstream NOx gas concentration further comprises adding a transport delay to the determined upstream NOx gas concentration to synchronize the upstream NOx gas concentration and the measured downstream NOx gas concentration prior to determining the first correlation between the upstream NOx gas concentration and the measured downstream NOx gas concentration.

3. The method of claim 1, wherein controlling the reductant injection based upon the first and second correlations comprises increasing reductant injection when the first and second correlations indicate under-dosing of the reductant into the exhaust gas feedstream.

4. The method of claim 3, wherein the first and second correlations indicate under-dosing of the reductant into the exhaust gas feedstream when the first correlation between the upstream NOx gas concentration and the measured downstream NOx gas concentration is greater than the second correlation between the upstream NOx gas concentration and the estimated downstream NOx gas concentration.

5. The method of claim 1, wherein controlling the reductant injection based upon the first and second correlations comprises decreasing reductant injection when the first and second correlations indicate over-dosing of the reductant into the exhaust gas feedstream.

6. The method of claim 5, wherein the first and second correlations indicate over-dosing of the reductant into the exhaust gas feedstream when the first correlation between the upstream NOx gas concentration and the measured downstream NOx gas concentration is less than the second correlation between the upstream NOx gas concentration and the estimated downstream NOx gas concentration.

7. The method of claim 1, wherein controlling the reductant injection based upon the first and second correlations comprises maintaining reductant injection when the first and second correlations indicate correct dosing of the reductant into the exhaust gas feedstream.

8. The method of claim 7, wherein the first and second correlations indicate correct dosing of the reductant into the exhaust gas feedstream when the first correlation between the upstream NOx gas concentration and the measured downstream NOx gas concentration equals the second correlation between the upstream NOx gas concentration and the estimated downstream NOx gas concentration.

9. A method for controlling reductant injection into an exhaust gas feedstream of a lean-burning internal combustion engine, the method comprising:
   determining a measured downstream NOx gas concentration in the exhaust gas feedstream based upon a signal output from a sensor configured to monitor NOx gas concentration downstream of a selective catalytic reduction (SCR) device;
   determining an estimated downstream NOx gas concentration in the exhaust gas feedstream based upon an executable model operative to determine NOx gas concentration downstream of the SCR device;
   determining a first correlation between an upstream NOx gas concentration and the measured downstream NOx gas concentration;
   determining a second correlation between the upstream NOx gas concentration and the estimated downstream NOx gas concentration;
   executing, via a controller, a feed-forward proportional-integral control routine to determine an ammonia storage correction term based upon the first and second correlations; and
   controlling the reductant injection into the exhaust gas feedstream upstream of the SCR device responsive to the ammonia storage correction term.

10. An exhaust aftertreatment system for a lean-burn internal combustion engine, comprising:
    a dosing system configured to inject a reductant into an exhaust gas feedstream upstream of a selective catalytic reduction (SCR) device;
    a NOx sensor configured to monitor the exhaust gas feedstream downstream of the SCR device;
    a controller in communication with the NOx sensor and operatively connected to the dosing system, the controller including executable code to monitor operation of the lean-burn internal combustion engine and control the dosing system in response to signal input from the NOx sensor, the executable code operative to:
       determine an upstream NOx gas concentration in the exhaust gas feedstream upstream of the SCR device,
       determine a measured downstream NOx gas concentration in the exhaust gas feedstream based upon a signal output from the NOx sensor,
       determine an estimated downstream NOx gas concentration in the exhaust gas feedstream based upon an executable model operative to determine NOx gas concentration downstream of the SCR device,
       determine a first correlation between the upstream NOx gas concentration and the measured downstream NOx gas concentration,
       determine a second correlation between the upstream NOx gas concentration and the estimated downstream NOx gas concentration,
       execute a feed-forward proportional-integral control routine to generate an ammonia storage correction term based upon the first and second correlations, and
    control the dosing system to inject reductant based upon the ammonia storage correction term.

11. The device of claim 10, wherein the lean-burn internal combustion engine comprises a compression-ignition engine.

12. The device of claim 10, wherein the lean-burn internal combustion engine comprises a lean-burn spark-ignition engine.

13. The device of claim 10, wherein the dosing system configured to inject a reductant into an exhaust gas feedstream upstream of the SCR device comprises a urea dosing system configured to inject urea into the exhaust gas feedstream upstream of an ammonia-SCR device.

* * * * *